US012250440B2

(12) United States Patent
Liu et al.

(10) Patent No.: US 12,250,440 B2
(45) Date of Patent: Mar. 11, 2025

(54) DUAL CONFERENCING SYSTEM

(71) Applicant: DTEN, Inc., San Jose, CA (US)

(72) Inventors: Wei Liu, San Jose, CA (US); Jin Guo, San Jose, CA (US); Sally Tung, San Jose, CA (US); Siqu Liu, San Jose, CA (US)

(73) Assignee: DTEN, Inc., San Jose, CA (US)

( * ) Notice: Subject to any disclaimer, the term of this patent is extended or adjusted under 35 U.S.C. 154(b) by 290 days.

(21) Appl. No.: 17/994,634

(22) Filed: Nov. 28, 2022

(65) Prior Publication Data

US 2024/0179384 A1 May 30, 2024

(51) Int. Cl.
*H04N 23/51* (2023.01)
*H04N 23/53* (2023.01)
*H04N 23/62* (2023.01)
*H04R 1/40* (2006.01)

(52) U.S. Cl.
CPC ............. *H04N 23/51* (2023.01); *H04N 23/53* (2023.01); *H04N 23/62* (2023.01); *H04R 1/403* (2013.01)

(58) Field of Classification Search
None
See application file for complete search history.

(56) References Cited

U.S. PATENT DOCUMENTS

| | | | | |
|---|---|---|---|---|
| 2005/0113135 | A1* | 5/2005 | Goebel | H04N 23/58 |
| | | | | 348/E5.026 |
| 2008/0079800 | A1* | 4/2008 | Kobayashi | H04N 7/142 |
| | | | | 348/E7.083 |
| 2013/0258180 | A1* | 10/2013 | Yu | H04N 23/00 |
| | | | | 348/E5.025 |
| 2018/0206016 | A1* | 7/2018 | Nugent | F16M 13/022 |

* cited by examiner

*Primary Examiner* — Hemant S Patel
(74) *Attorney, Agent, or Firm* — LEMPIA SUMMERFIELD KATZ LLC

(57) ABSTRACT

An immersive teleconferencing system includes three-dimensional sides positioned about a vertical axis forming a line of reflection of the immersive teleconferencing system. Tree-dimensional sides terminating at ends form an enclosure that houses a camera housed at a substantially central position. A first loudspeaker is disposed above the camera about the vertical axis and a second loudspeaker is disposed below the camera about the vertical axis.

21 Claims, 18 Drawing Sheets

DUAL CONFERENCING SYSTEM

BACKGROUND OF THE DISCLOSURE

1. Technical Field

This disclosure relates to video communication devices, and more particularly to teleconferencing systems.

2. Related Art

In teleconferencing systems images are captured by cameras. The cameras generate frames on a light sensitive media that are transmitted to remote participants. Some teleconferencing systems cannot capture backgrounds or convey entire scenes.

In some systems, a narrow field of view and a low spatial resolution restrict image fidelity. The systems' failure to capture meeting environments can create a disconnect between participants in the same meeting. When systems fail, some participants can become distracted and meetings can lose their effectiveness.

DETAILED DESCRIPTION

An immersive teleconferencing system generates images that roll off one or more screens. One or more centrally located cameras capture images of a video conference space. At participants' sitting eye-level one or more centrally located cameras are positioned amongst two loudspeakers. Some camera(s) capture participants in a video conference space equally, without rendering visual artifacts or incurring the computational costs that prevent real time conferencing.

The one or more cameras' position establishes the perspective from which images are captured. Different camera positions generate different angled shots that capture different perspectives. A low-angle shot of a participant joined with a high-angle shot of a participant suggests a power dynamics between the participants, with the higher framed participant projecting a stronger appearance. When the camera takes a high-angle shot, the camera is pointing down at participants. Frequently, high angle shots show participants in an inferior position created by the camera looking down on them.

Figure 18:
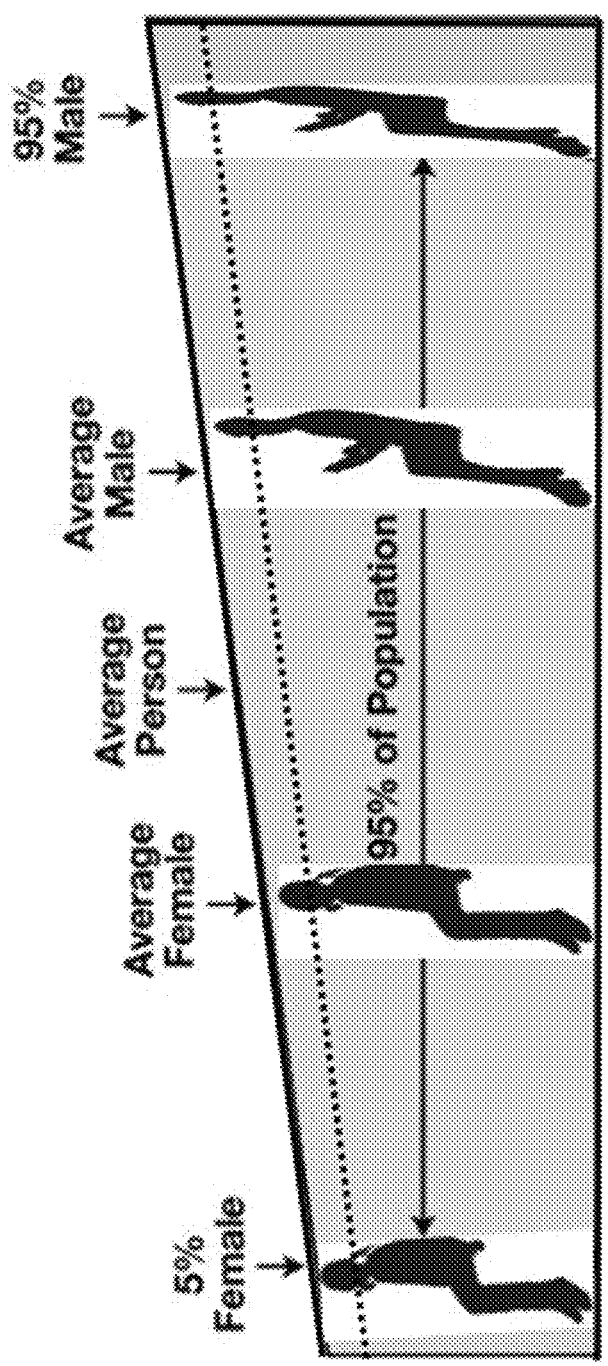
FIG. 18 represents an empirical sample of male and female participants in a sitting position on a common level position with the dashed line representing an axis passing through the center between the participants' eyes.

The eye-level shot based on the disclosed algorithm captures an image of a participant at the center axis passing between participants' eyes (see the dashed line in FIG. 18). Because of the uniqueness of individuals and other factor, an eye-level camera is defined by the camera(s)' position (e.g., the camera's vertical height) and tilt angle (also referred to as a geometric tilt angle). It reflects how the camera(s) view participants and how participants view a teleconferencing display and its camera(s). The physical alignment that simulate eye-level contact with participants from a sitting position defines as an eye-level camera or a sitting eye-level. The eye-level camera renders images that others see and expect to see in real life, with participants' lines of sight looking directly into other participants' line of sight.

When participants look at a display (also referred to as a screen and/or display screen) from a sitting position, they often look into the immersive teleconferencing system's camera(s) too at or substantially at the same height. The camera(s)' position simulate eye contact, break up wall space, and connect remote and local participants in an intimate way. Eye-level shots make meetings more engaging as they allow users to see how someone actually appears. Participants do not need to look up or down to engage with others.

An eye-level shot is focused at or substantially at the center axis between the participant's sight lines. Because participants are unique for many reasons including those expressed in Table 1, the immersive teleconferencing systems define eye-level camera by the camera(s)' height and the camera(s)' tilt angle. The immersive teleconferencing systems simulates direct eye-level contact (also referred to as virtual eye contact and/or direct virtual eye contact) by the algorithm described herein that is defined as an eye-level camera and/or a camera positioned at an eye-level.

Table 1 summarizes and FIG. 18 represents participants' empirical data, with the average participant in a sitting position having an eye height between about 44-48.5 inches.

TABLE 1

Average anthropometric measurements of eye height, elbow height, and eye-to-elbow measurements and the variances between females and males

| | Eye Height | | | Elbow Height | | | Eye-to-Elbow | |
|---|---|---|---|---|---|---|---|---|
| | Standing | Sitting | Variance | Standing | Sitting | Variance | Standing | Sitting |
| Avg. female | 59.4 | 44.0 | 15.4 | 38.8 | 23.0 | 15.8 | 20.6 | 21.0 |
| Avg. person | 61.7 | 46.1 | 15.6 | 40.4 | 24.9 | 15.5 | 21.3 | 21.2 |

TABLE 1-continued

Average anthropometric measurements of eye height, elbow height, and eye-to-elbow measurements and the variances between females and males

| | Eye Height | | | Elbow Height | | | Eye-to-Elbow | |
|---|---|---|---|---|---|---|---|---|
| | Standing | Sitting | Variance | Standing | Sitting | Variance | Standing | Sitting |
| Avg. male | 64.4 | 48.5 | 15.9 | 42.5 | 27.0 | 15.5 | 21.9 | 21.5 |
| Variance f/m | 5.0 | 4.5 | NA | 3.7 | 4.0 | NA | NA | NA |

To account for difference in sitting heights, the immersive teleconferencing systems establish a tilt angle. While ideally a camera's tilt angle would be about zero degrees, the tilt angle is adjusted to account for sitting height differences amongst video conferencing participants. For example, a tilt angle of plus or minus about nine degrees captures about five percent of the empirical sample's female participants and about ninety-five percent of the male participants within about one meter of the display(s) of the immersive teleconferencing systems.

TABLE 2

Average anthropometric measurements of eye height, elbow height, and eye-to-elbow measurements and the variances between five percent of the females and ninety-five percent of the males

| | Eye Height | | | Elbow Height | | | Eye-to-Elbow | |
|---|---|---|---|---|---|---|---|---|
| | Standing | Sitting | Variance | Standing | Sitting | Variance | Standing | Sitting |
| 5% female | 55.7 | 40.8 | 14.9 | 36.5 | 20.8 | 15.7 | 19.2 | 20.0 |
| 95% male | 68.6 | 52.1 | 16.5 | 45.4 | 29.5 | 15.9 | 23.2 | 22.6 |
| Variance f/m | 12.9 | 11.3 | NA | 8.9 | 8.7 | NA | NA | NA |

An eye-level position of the camera(s) (represented as $H_{camera}$) is defined by a function of the horizontal watching distance (HWD, positively correlated to the size of the display(s)), the participant(s)' tilt angle ($\Phi$), and an empirical height constant ($H_{eye}$). A positive correlation means that as the size of the display increases so does the horizontal watching distance.

In some immersive teleconferencing systems' use cases, direct and/or indirect observations and participant experiences determine HWD or an optimal watching distance or HWD ranges. Through a deduction process, measurable observations and/or surveys are taken to record and analyze the data. In these systems, the trials are repeated for display sizes and different sample participant groups. The results are evaluated through statistical tools such as regression, risk coefficient, t-test, chi square, and/or different forms of ANOVA (analyses of variance). The results are then evaluated and HWD and/or HWD ranges are derived. The HWD evaluation cycle includes generating a tentative range or tentative distance that accounts for an optimal watching experience (induction), formulating different teleconferencing arrangements to validate the tentative HWD and/or HWD ranges (deductions), testing those tentative HWD and/or HWD ranges (testing), and interpreting the results and explanations to generate an optimal HWD and/or HWD range (evaluation).

In some immersive teleconferencing systems' use cases, $H_{eye}$ comprises a weighted average of expected participants' sitting eye-level heights. In other immersive teleconferencing systems' use cases, $H_{eye}$ comprises the estimated or measured range of sitting eye heights of fifty percent of the average female population of a country, such as the United States for example, and fifty percent of the average male population of that same country (the United States in this example).

Positioning a camera at eye-level ($H_{camera}$) is thus defined by equations 1 and 2.

$$H_{camera} = H_{eye} + HWD \times \tan(\Phi) \qquad \text{Equation 1}$$

$$H_{camera} = H_{eye} + HWD \times \tan(-\delta/\Theta)) \qquad \text{Equation 2}$$

where $H_{eye}$ is the empirical height constant; HWD is the horizontal watching distance (e.g., a quantitative value), $\Phi$ is the participant(s)' tilt angle, $\delta$ is the camera's tilt angle, and $\Theta$ is the empirical tilt angle. The participant(s)' tilt angle ($\Phi$) is a linear function of the camera tilt angle ($\delta$) and the empirical tilt angle ($\Theta$) as expressed in Equation 3. In some uses cases, the empirical tilt angle ($\Theta$) comprises a composite or average tilt angle of fifty percent of the average female population of a country and fifty percent of the average male population of that country or alternatively, a weighted average of the samples. In some use cases $\Theta$ is limited or capped to a positive or negative constant, such as within a range of about plus or minus nine degrees for example at a HWD of one meter. A common use case $\Theta$ restriction is enforced when one or more display(s) comprise touch screens that respond to participants' physical contact with the touch screens.

$$\delta = \Theta - \Phi \qquad \text{Equation 3}$$

Tables three and four show the measurements of additional use cases showing a centrally positioned camera's vertical position at an eye-level height using a fifty-five inch immersive teleconferencing display and a seventy-five inch immersive teleconferencing display, respectively, with respect to $\Phi$ and $H_{eye}$. Table 5 shows participant(s)' tilt angle ($\Phi$) with respect to the empirical tilt angle (Q) and the centrally positioned camera's tilt angle ($\delta$).

TABLE 3

Position of a camera at eye-level with respect to
Φ and $H_{eye}$ for fifty-five inch immersive teleconferencing
display at an HWD of 2.27 m.

| | $H_{eye}$ | | | | | |
|---|---|---|---|---|---|---|
| Φ | 44 | 46 | 47 | 48 | 49 | 50 | 51 |
| 0 | 44 | 46 | 47 | 48 | 49 | 15.8 | 20.6 |
| 5 | 44.2 | 46.2 | 47.2 | 48.2 | 49.2 | 50.2 | 51.2 |
| 10 | 44.4 | 46.4 | 47.4 | 48.4 | 49.4 | 50.4 | 51.4 |

TABLE 4

Position of a camera at eye-level with respect to
Φ and $H_{eye}$ for seventy-five inch immersive
teleconferencing display at an HWD of 122 m.

| | $H_{eye}$ | | | | | |
|---|---|---|---|---|---|---|
| Φ | 44 | 45 | 46 | 47 | 48 | 49 |
| 0 | 44 | 45 | 46 | 57.67 | 58.67 | 59.67 |
| 5 | 54.67 | 55.67 | 56.67 | 57.67 | 58.67 | 59.67 |
| 10 | 65.51 | 61.77 | 62.77 | 63.77 | 64.77 | 65.77 |

TABLE 5

Participant(s)' tilt angle (Φ) with respect to the empirical
tilt angle (Θ) and the camera's tilt angle (δ).

| | Θ | | | | |
|---|---|---|---|---|---|
| δ | −10 | −5 | 0 | 5 | 10 |
| 0 | 10 | 5 | 0 | −5 | −10 |
| 5 | −5 | 0 | 5 | 10 | 15 |
| 10 | 15 | 10 | 5 | 0 | −5 |
| 15 | 0 | 5 | 10 | 15 | 20 |

While some immersive teleconferencing systems use a single camera, alternative immersive teleconferencing systems use multiple cameras. Some are centrally located and others are peripherally located. The cameras capture images that appear to remote and local participants as if they were rendered by a single camera. In some immersive teleconferencing systems, the multiple cameras that generate these images are a cluster (e.g., a central cluster, a distal cluster, a proximal cluster, a peripheral cluster, etc.). They are two or more cameras that render images that appear to be one.

In some alternate immersive teleconferencing systems, one or more centrally located cameras and one or more peripheral cameras share a virtual point of capture. An alignment algorithm generates an alignment map based on image regions of overlap between the image capture cameras boundaries relative to the virtual point of capture. The alignment algorithm encodes a weave that registers the individual image frames captured at common points in time into a composite frame that conveys an unbroken view of the video conference space. The alignment map is computed when a meeting starts in some systems, in response to one or more image events in other systems (e.g., when an active speaker changes, a meeting within a meeting commences, a participant joins, a background changes, etc.), when the immersive teleconferencing system is launched in other systems, and/or in combination of these occurrences. In each instance, the alignment maps are processed to generate composite frames during real time video conferencing and/or real time data feeds. The terms real time and real-time refer to immersive teleconferencing systems that update and transmit/receive information at the same rate as the systems capture and/or receive images and data, enabling the processor(s) 1702 (shown in FIG. 17) to direct and control remote client devices and/or local and/or remote teleconferencing systems. Some real-time systems operate at a rate faster rate than the rate at which data and/or images are received by their use of one or more parallel processors (also represented as 1702).

In some alternate systems, a weave is rendered by breaking up the images captured by two or more cameras into frequency band filtered image components of variable lengths. Images in each spatial band are assembled into frequency band composites at discrete instances in time. Image components are joined, in some systems by a weighted average that weaves adjoining images captured from regions of overlap between two or more cameras. In some systems, the weighing and/or weighted average is based on the wavelength captured in each of the spatial bands that form the composite image. The frequency-band images are summed to generate a pixel-weighted map that renders high fidelity images free of visual artifacts. A pixel-weighted map comprises a three or four dimensional representation that describes the layout at the pixel-level of a portion of or all of the video conference space stored in a memory that establishes the association between image segments and/or their characteristics and/or their corresponding memory addresses that retain them. When artifacts occur or when artifacts are detected they are attenuated and/or substantially dampened. When image objects occur near and/or within adjoining camera boundaries, the composite image at those portions of the pixel-weighted map are blended at predetermined ratios based on empirical data (e.g., based on measured or estimated wavelengths) to retain the finer image details near or within composite boundaries and/or overlap areas. The process generates a seamless field of view. By maintaining the features and finer details in each of the camera regions, the immersive teleconferencing system constructs images with larger fields of view and in a greater level a detail than image regions captured by some single and/or multiple camera systems without postprocessing. Further, some alternative immersive teleconferencing systems combine synthetic or user generated/sourced images with those captured by one or more cameras or camera clusters to generate naturally looking imagery (e.g., with smooth seams and minimal distortion, such as less than about five percent).

Figure 1:
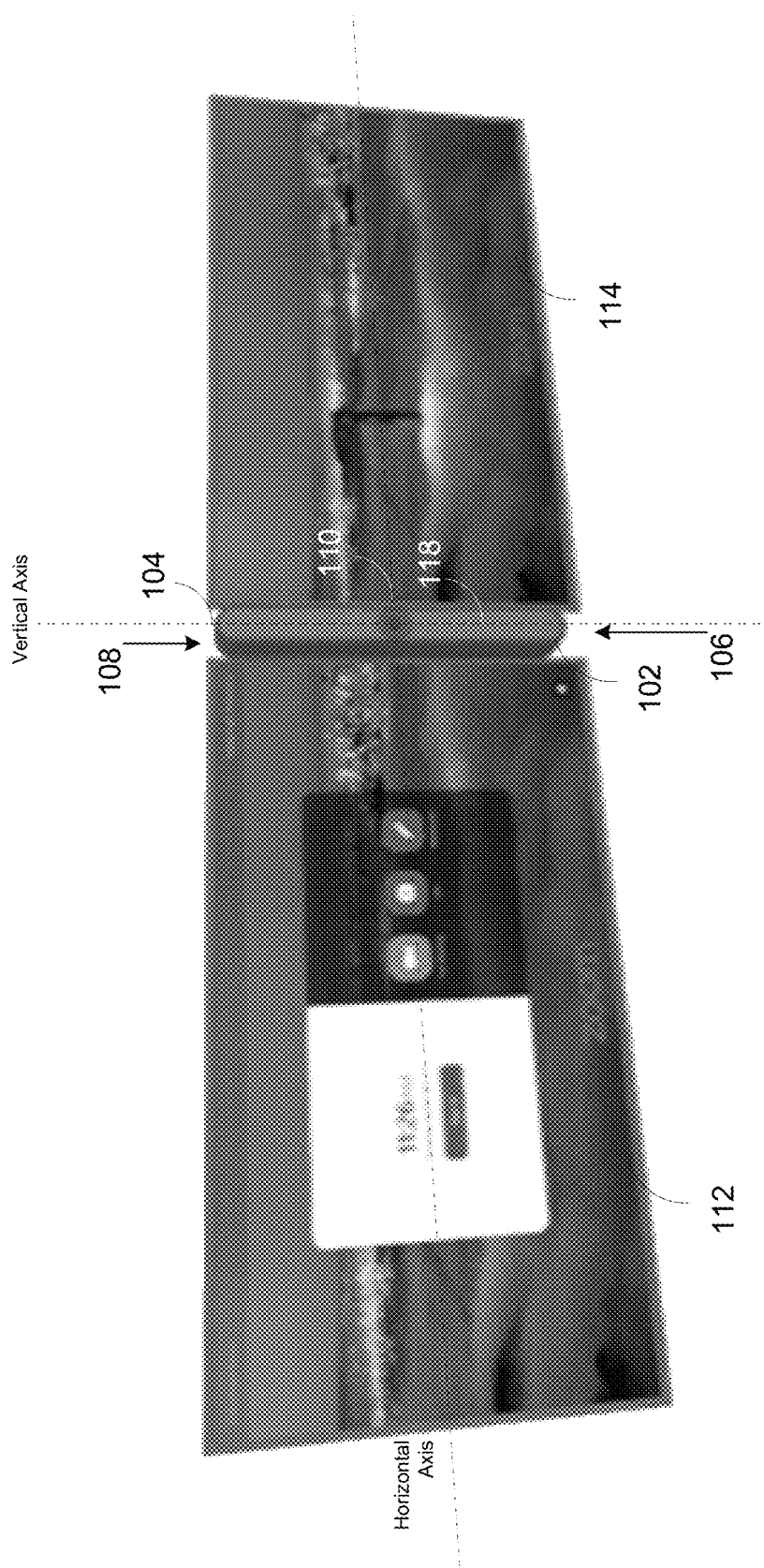
FIG. 1 is an immersive teleconferencing system.

FIG. 1 is an immersive teleconferencing system that includes one or more cameras (one may be positioned at a sitting eye-level) vertically positioned between an upper and lower loudspeakers along a vertical axis. The vertical axis and horizontal axis form lines of refection of the enclosure and in other systems a line of reflection of the camera and the loudspeakers. In FIG. 1, a pair of three-dimensional sides 102 and 104 terminating at two three dimensional semicircular ends 106 and 108 form the longitudinal or substantially vertically extending (e.g., referred to as vertically extending) enclosure separating two optional screens 112 and 114 of equal shape and size (e.g., size is defined by the length of a diagonal across their respective screens). An optional camera cluster 110 or a single camera 110 (collectively referred to as a camera 110) is located substantially at or at a mid-point of the vertically extending enclosure. The camera's 110 central/middle position is also relative to the horizontal and vertical dimensions of the optional screens 112 and 114. The semicircular ends 106 and 108 of the exemplary vertically extending enclosure are positioned above and below lengthwise edges of the optional screens 112 and 114 (also referred to as teleconferencing screens, lateral screens, screens, displays, etc.). The optional screens 112 and 114 comprise organic light emitting diode (OLED) screens, micro light emitting diode, quantum dot light emitting diodes (QLED), light emitting diode (LED) screens, and/or other screens. The optional screens 112 and 114 are capable of rendering frame-by-frame panoramic views of a video conference space that allow users to overlay different and/or similar content on each of the optional screens 112 and 114 and/or actuate one or more optional graphic device interfaces (also referred to as a graphics display system). An optional graphics display system display or prints images, and other graphical elements on captured environments. The optional graphics display system enables the immersive teleconferencing system to draw or render dialog boxes, buttons, and other synthesized elements in a consistent style on the one or more or across screens 112 and 114 by calling the appropriate screen drivers and passing them the information on the item to be drawn. The optional graphics display system also works with physical or wireless printers, which receive data or screen captures printing. The optional graphics display system calls the appropriate printer drivers and moves the image(s) and/or documents directly to one or more printers. In some systems, the graphics display system reformats the images or documents with or without the drawn objects to the desired printer language.

In some immersive teleconferencing systems, the optional obround curved front 118 and parallel side edges enclose the loudspeaker system such as an all-in-one or interfaceable loudspeaker system (e.g., a device that converts electrical signals into aural signals; also referred to as a speaker and a loudspeaker) that delivers high-quality aural sound without requiring the space, the complexity, or incurring the expense of a separate audio receiver and surround sound loudspeakers. The exemplary obround cross-sectional shape of the substantially vertical enclosure is much longer than it is wide allowing the enclosure to deliver sound across many direct audio paths to standing and sitting participants. With a greater height constraint than horizontally configured systems, the camera 110 and loudspeakers can capture nearly all of the local images and local vocal content in the conference space and reproduce nearly all of the remote vocal and video content smoothly and predictably from all participants. In some systems, sound is delivered and/or converted into electrical signals (e.g., via one or more microphones) through an exemplary beamforming sensor array that may be surrounded by an enclosure. Beamforming is achieved by combining elements in an array in such a way that aural signals at particular angles experience constructive interference while others experience destructive interference allowing the system deliver and/or detect sound directly from participants, exclusively. The sound travels in a substantially straight line to and from designated or predesignated participants, which minimizes room reverberation. The audio system allows the immersive teleconferencing system to fill and convert sound in the teleconferencing space with about twenty hertz to about twenty-thousand frequency hertz signals to the participants without a separate-speaker/audio receiver system.

Figure 2:
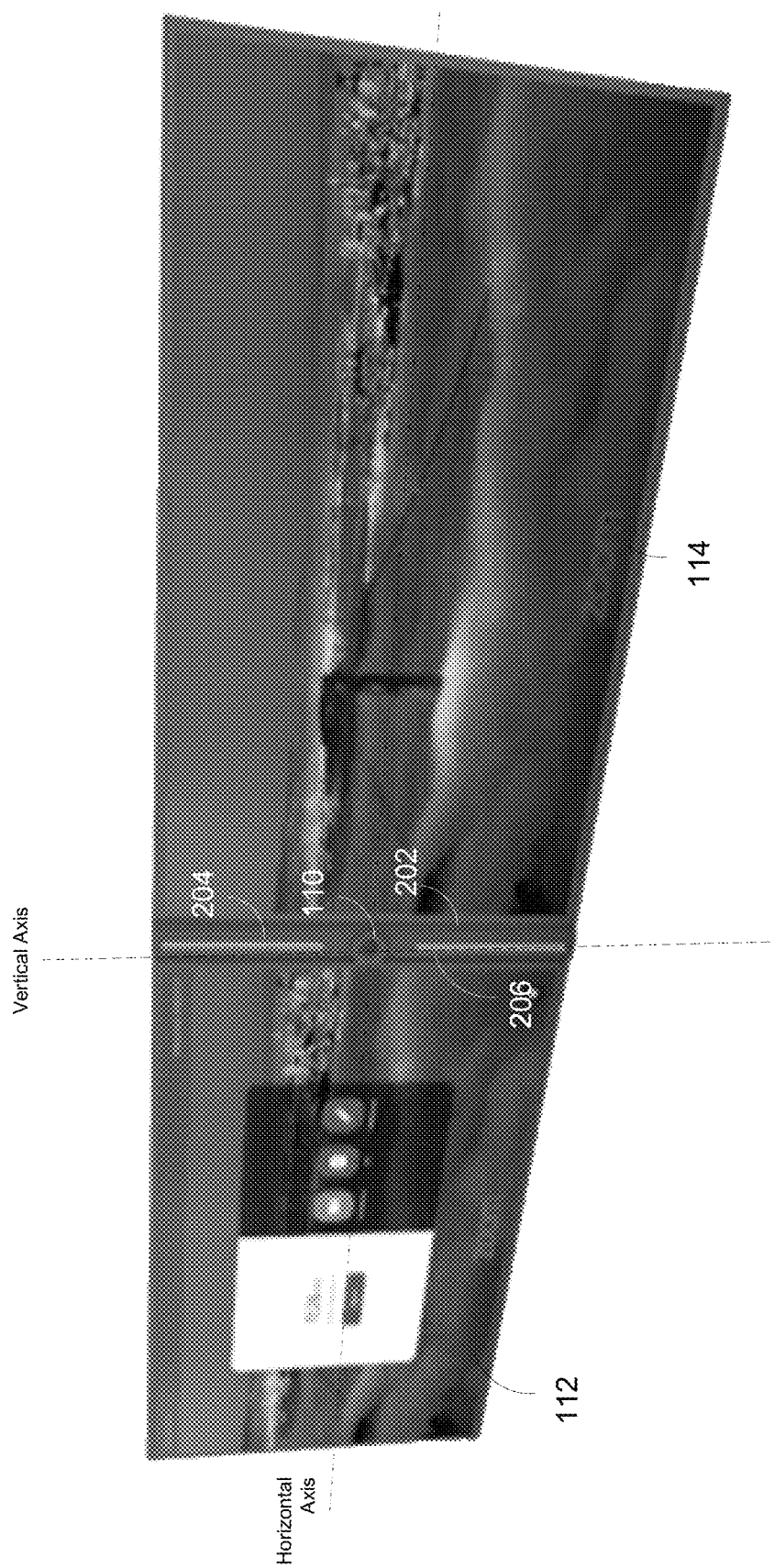
FIG. 2 is a second immersive teleconferencing system.

FIG. 2 is a second immersive teleconferencing system that include camera clusters 110 or one camera positioned substantially equidistant between two or more loudspeakers along a substantially vertical axis. In some systems one or more of camera(s) 110 may be positioned at a sitting eye-level. In some systems, the camera(s) 110 are enclosed in an exemplary substantially planar or Quonset-shaped enclosure 202. The exemplary Quonset-shaped or substantially vertical enclosure provides better sound control because it allows sound to be directed to more participants without requiring drivers that cause some frequencies to be canceled and others to be reinforced at off-axis positions as occurs in some horizontal configurations. In FIG. 2, optional latitudinal lateral bars (referred to as lateral bars) 204 and 206 extend from central ends of a central camera area to proximal and distal ends such as proximal and distal cylindrical ends of the enclosure dividing upper and lower portions of the enclosure 202. In some systems, the distinctive raised rectangular or obround shaped lateral bars 204 and 206 are functional, ornamental, and/or serve as a source identifier. In an exemplary system, the lateral bars 204 and 206 comprise light emitting diodes that sync in real-time with the color and/or the sounds received and/or transmitted by the immersive teleconferencing system. The light emitting diodes enhance the ambience of the teleconferencing space by creating a custom visual experience that compliments the content and information delivered by the immersive teleconferencing system, and in some systems, reduce participant eye strain induced by video conferencing sessions.

In FIG. 2, the light emitting diodes deliver hues across about a 380 to about a 700 nanometer spectrum. Each lateral bar segment 204 and 206 (two are shown in FIG. 2., other systems include more and others include less) is customized for multiple color renderings and discrete brightness controls simultaneously, and can be customized to individual users, in a hub 1614 shown in FIG. 16. The sync box or hub shown in FIG. 16 within the enclosure acts as a command center for the light emitting diodes that provides nuanced controls that can be accessed with the immersive teleconferencing system mobile device app via a Wi-Fi (Wireless Fidelity), Bluetooth®, and/or cellular connection and/or a smartphone when users possess access rights. In some systems, the control setting are actuated (and/or turned off) and controlled by voice commands in the voice command system that interfaces the alternative immersive teleconferencing systems.

An interface within the immersive teleconferencing system app provides an intuitive control system application that interfaces the hub 1614. The user interface enables external control of immersive teleconferencing system. The control may occur through physical and digital detections conveyed, sensed, and/or processed by one or more touchless gestures sensed by a gesture control (as sensed by the gesture control systems described in U.S. Ser. No. 16/997,323 assigned to Applicant of this disclosure, which is herein incorporated by reference in its entirety) and/or a physical touch gesture. The systems allow users to control the immersive teleconferencing system through a more natural process, that in some systems, provide visual, aural, and/or tactile responses (e.g., confirmations, via the mobile phone app) without requiring the user to step through unnatural processes.

Figure 3:
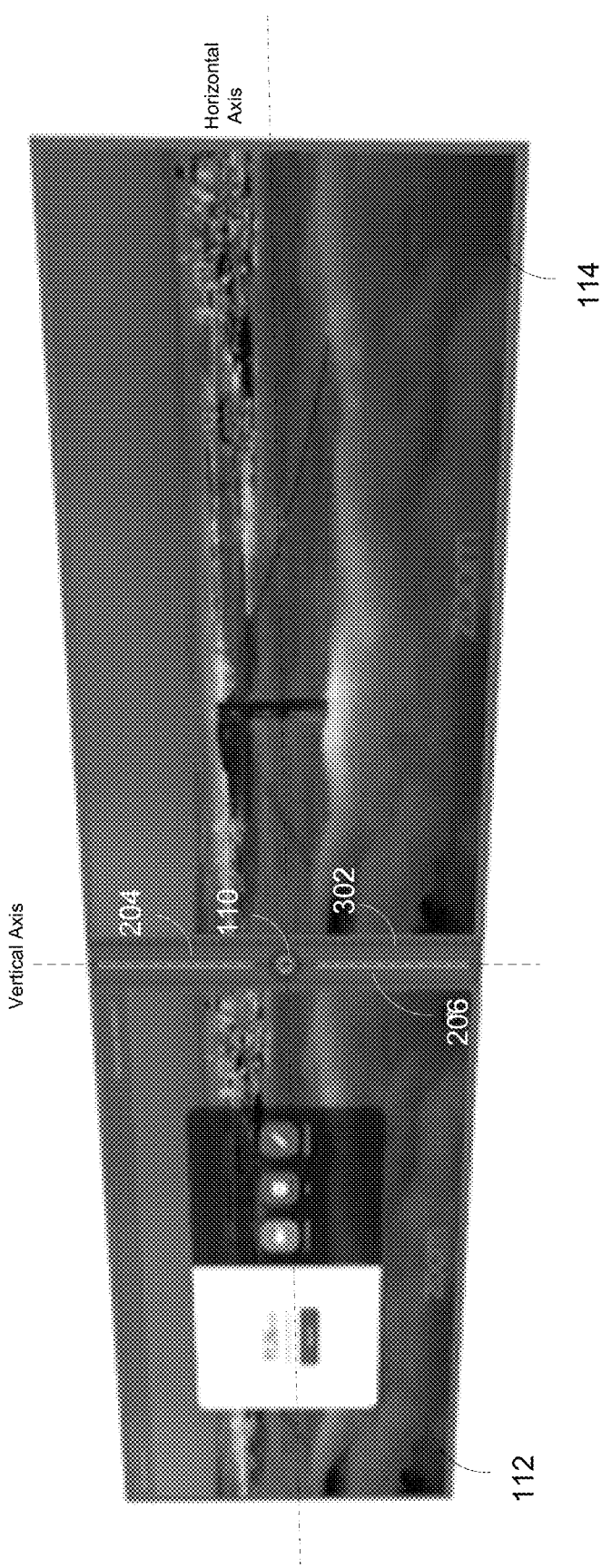
FIG. 3 is a third immersive teleconferencing system.
Figure 4:
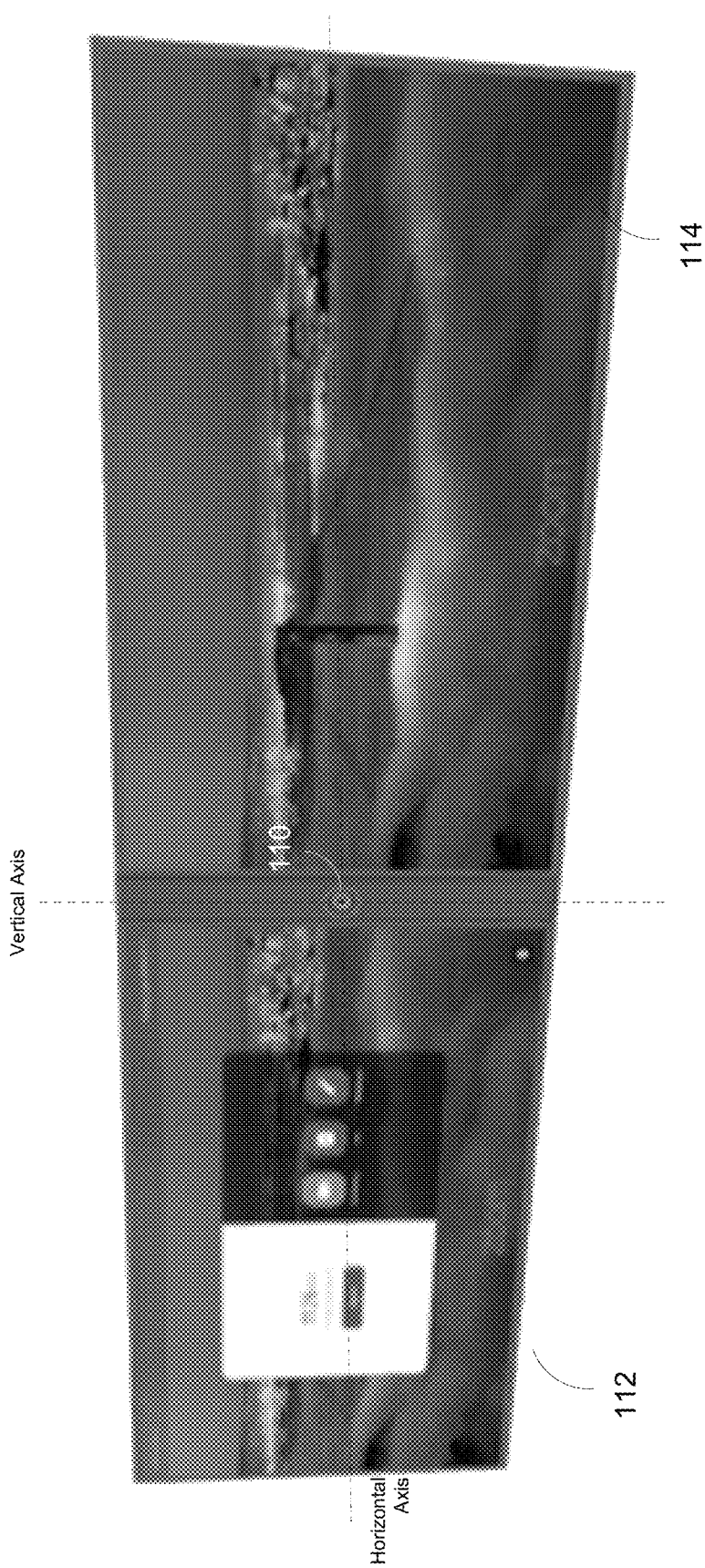
FIG. 4 is a fourth immersive teleconferencing system.

FIGS. 3 and 4 are a third and fourth immersive teleconferencing systems that also includes one or more camera clusters 110 or a single physical camera that can interface two or more displays 112 and 114. The camera(s) 110 are positioned between two matched loudspeakers. In some systems the camera(s) are positioned about or along a substantially vertical axis in an enclosure having lines of symmetry across vertical and horizontal axis or positioned along these lines of symmetry. Like the systems described, the centrally positioned camera 110 can be mechanically and electrically coupled to two side-by-side displays 112 and 114 joined at opposite sides of the enclosure and may be positioned at a sitting eye-level. In FIGS. 3 and 4, a wide angle camera positioned between the two or more loudspeakers couples one or more optional touch sensitive and/or non-touch sensitive displays 112 and 114 directly or through intermediate parts. The substantially vertical shape of the enclosure may comprise a parallelogram with all of the corner (vertices) forming about ninety degree angles like the exemplary enclosure of FIG. 3. The exemplary vertically running rectangular parallelepiped enclosure of FIG. 4 has all rectangular faces increasing the surface areas exposed to the video conference space.

In FIG. 3, lateral bars 204 and 206 extend from central ends of a central camera 110 area to proximal and distal half-right cylinder or linear ends of the enclosure dividing upper and lower portions of the enclosure 302. A horizontal or curved bar (not shown) is positioned directly above the camera 110 and/or or directly below the camera 110 and/or may outline the perimeter of the camera 110. Like the lateral bars 204 and 206 described herein, the horizontal or curved bars are functional, ornamental and/or serve as a source identifier. In an exemplary system, the horizontal or curved bars function like the lateral bars 204 and 206 and may comprise light emitting diodes that in some alternate systems sync with the color, the intensity (e.g., audio levels) and/or aural sounds received and/or transmitted by the immersive teleconferencing system.

Figure 5:
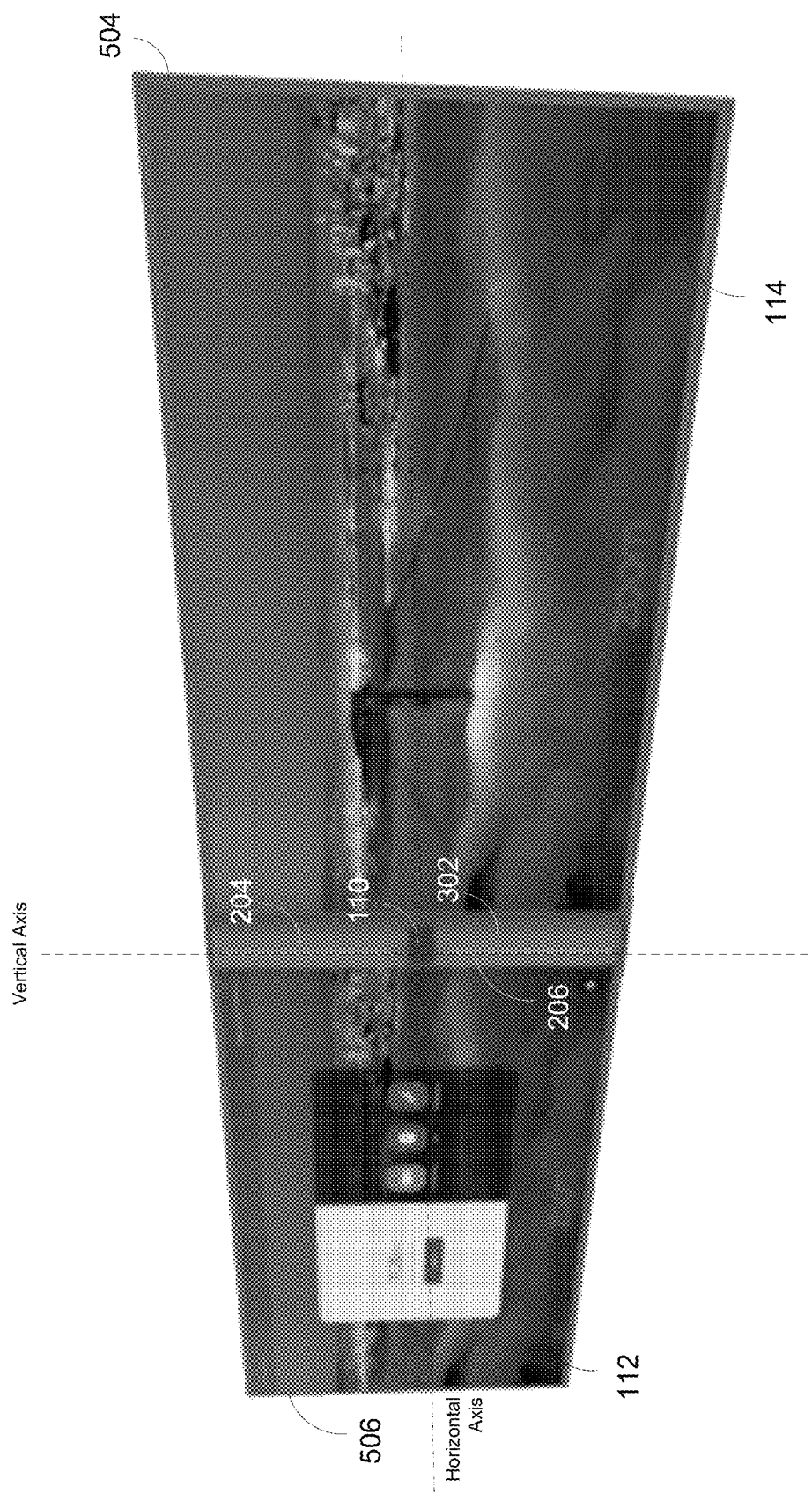
FIG. 5 is a fifth immersive teleconferencing system.
Figure 6:
FIG. 6 is a sixth immersive teleconferencing system.

FIGS. 5 and 6 are the fifth and sixth immersive teleconferencing systems that includes three and four camera clusters, or an individual camera, respectively (called a three or four camera system). In the three camera system, the central camera 110 is housed in a central location above and below a loudspeaker along a substantially vertical axis. In some alternate systems, the vertically oriented enclosure has a cross-section of a right pentagonal prism (e.g., a prism in which the lateral edges are substantially perpendicular to a rear base) terminating at beveled ends that couple the optional lateral bars 204 and 206. In FIG. 5, a front facing and two side facing sides projecting outward (referred to as three dimensional sides) enclose two or more speakers positioned about a substantially centrally positioned camera 110 relative to the horizontal dimensions of the screens 112 and 114 or horizontal axis. The centrally located camera 110 has a relatively short focal length and a wide field of view. The centrally located camera 110 captures more of the teleconferencing space than conventional cameras as it or its lens is positioned at a vertical height of the participants sitting eye-level. The centrally located camera 110 has a one-hundred and eighty degree horizontal axis field of view allowing the immersive teleconferencing system to capture all or nearly all of the participants' physical activity. The camera gives remote users the feeling of being there—as though they're viewing the teleconferencing space from that room with their own eyes rather than looking at a static screen or a photograph.

In FIG. 5, an exemplary two cameras 110 or clusters are positioned near the mid-sections of the respective optional screens 112 and 114. The cameras 110 housed in a substantially vertical or latitudinal shaped enclosure. In FIGS. 5 and 6, the optional remaining cameras are unitary or integrated within the respective distal and proximal latitudinal lateral bezels 504 and 506 of the screens, respectively, and a telephoto mode and/or camera allows the user and/or participants to zoom in on an object, allowing the system to focus on the object as a whole without losing its detail. In some systems, the long-focus lens allows the immersive teleconferencing system to utilize a focal length shorter than the physical lens of a camera allowing objects to appear closer than they actually are.

Figure 7:
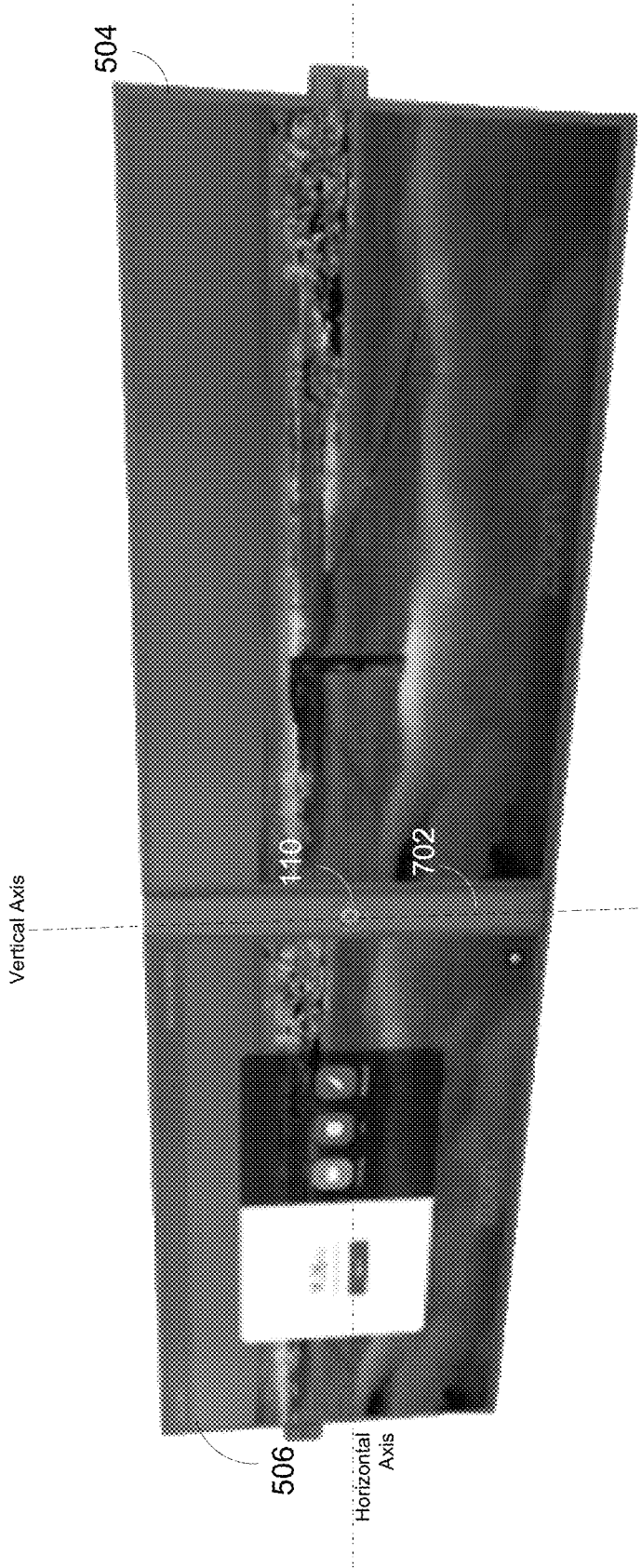
FIG. 7 is a seventh immersive teleconferencing system.
Figure 8:
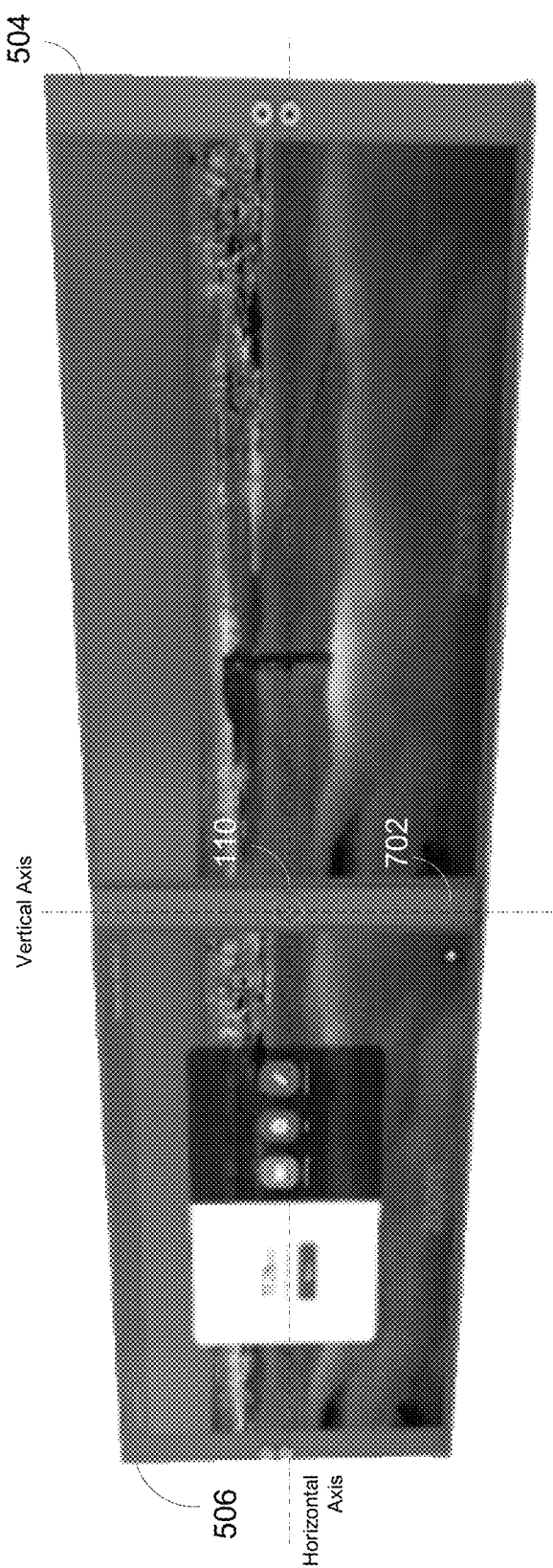
FIG. 8 is an eighth immersive teleconferencing system.
Figure 9:
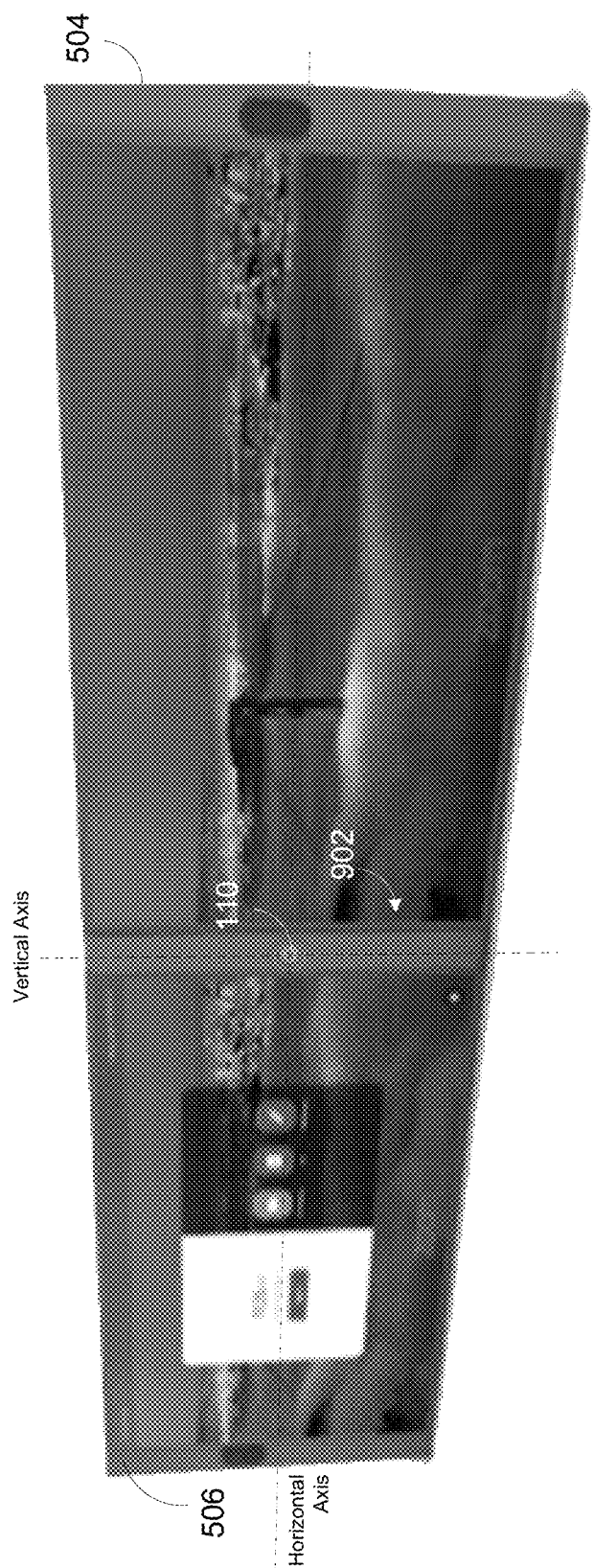
FIG. 9 is a ninth immersive teleconferencing system.

FIGS. 7-9 are the seventh through ninth immersive teleconferencing systems that include multiple cameras. One of the multiple cameras may comprise a centrally located camera 110 that may be eye-level positioned and includes a wide angle lens positioned between two loudspeakers along a substantially vertical axis. Some wide angle lens provide nearly a one-hundred and eighty degree field view allowing the participants to see a half of a full rotation about the object. Some immersive teleconferencing systems use rectilinear wide angle lenses that minimize distortion by rendering the lines that render images on the screen as substantially straight lines. Some immersive teleconferencing systems use a tilt-shift lens that project larger images than a full frame sensor. In some tilt-shift systems, participants and/or users can cause the system to move the lens across a plane parallel to the camera's sensor (via a tracking sensor and a processor) causing the converging lines that render the image to be parallel and/or for the parallel lines to converge rendering substantially non-distorted views.

Figure 10:
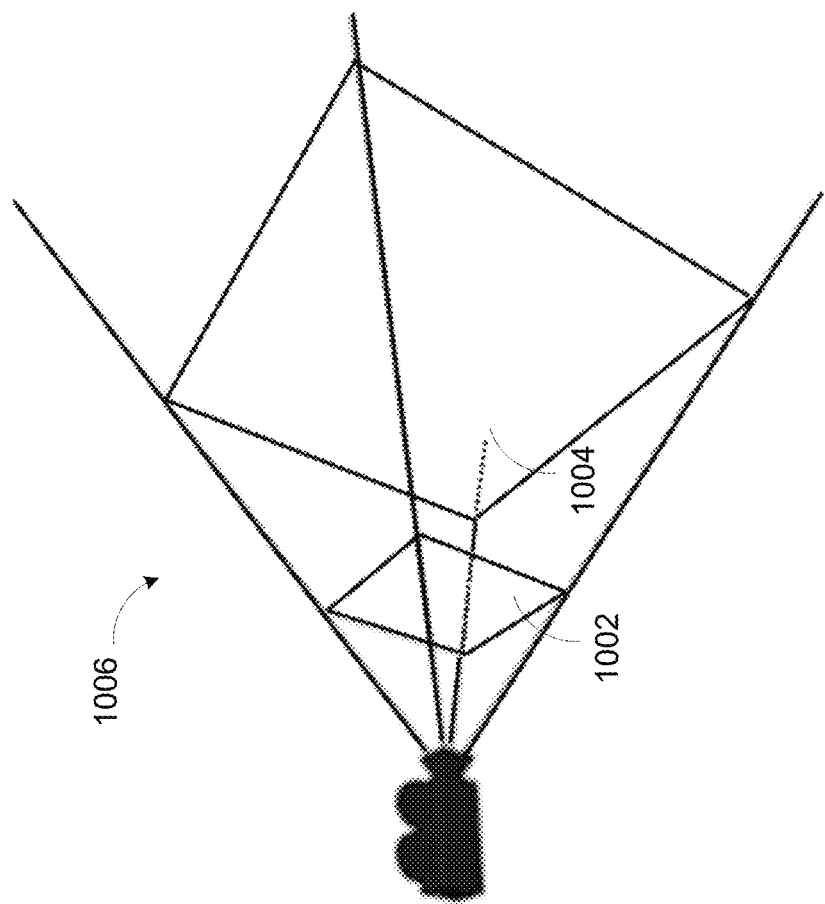
FIG. 10 is an image capture area within a video conference space showing a near plane and a far plane.

In FIGS. 7-9, the central substantially vertically positioned camera 110 between two loudspeakers is a wide angle camera and the peripheral cameras (e.g., those positioned near the proximal and distal ends of the screen or within the bezels) capture the near and far plane views 1002 and 1004 (shown in FIG. 10), respectively of the teleconference space and provide substantially non-distorted views of objects and/or participants near and far. The captured details in a captured imaged are contained within a truncated, substantially pyramid-shaped volume 1006 shown as a frustum in FIG. 10. The frustum represents the peripheral camera field of view. Features that fall outside of the frustum are not captured. To determine which objects are in front of other objects, the size of the frustum is established as finite, and extends as far from the camera until it cannot sense the light spectrum. The sides of the frustum parallel to the cameras' lenses are the near and far clipping planes, because anything outside the frustum, beyond these planes, is omitted from view in this exemplary immersive teleconferencing system as shown in FIG. 10. The distances of the near and far clipping planes 1002 and 1004 from the respective cameras (or clusters) and the respective images that they capture are calculated automatically by optional spatial sensors of the immersive teleconferencing system unitary to the enclosures. The distance from the camera to the nearest object in the scene is estimated by an optional proximity sensor and a processor, and the near clipping plane 1002 is processed to be in front of it. In some systems, a near view camera adjusts the distance so that the largest distance possible between multiple objects is automatically selected so that nearby objects and participants and their details are visible to the near focused camera. This adjusted distance specifies where the near plane of the frustum (e.g., what remains of the pyramid-shaped volume 1006 after truncating along a plane parallel to the base) lies in relation to the camera, but it also impacts the far plane 1004. When a very small near plane distance is used, the far plane is very close, and objects in the distance may be left out of near view camera(s), but are captured by the far view camera or cluster.

In FIGS. 7-9, the substantially flat 702 or raised rectangular substantially vertically extending enclosure 902 houses the central camera 110, between two or more loudspeakers along a substantially vertical axis. The vertical and horizontal axis form lines of symmetry of the vertical extending enclosure 902 in some systems, to the central camera 110 in other systems, and the entire immersive teleconferencing system in other systems. In some systems, one or more telephoto clusters and/or camera clusters having a focal length between about 35 mm and about 50 mm are unitary with or integrated to the proximal and distal peripheral enclosures. In FIGS. 7 and 9, the exemplary peripheral enclosures are substantially flat and segmented. In FIG. 8, the peripheral enclosures house multiple camera clusters and are substantially flat and extend across longitudinal perimeters.

Figure 11:
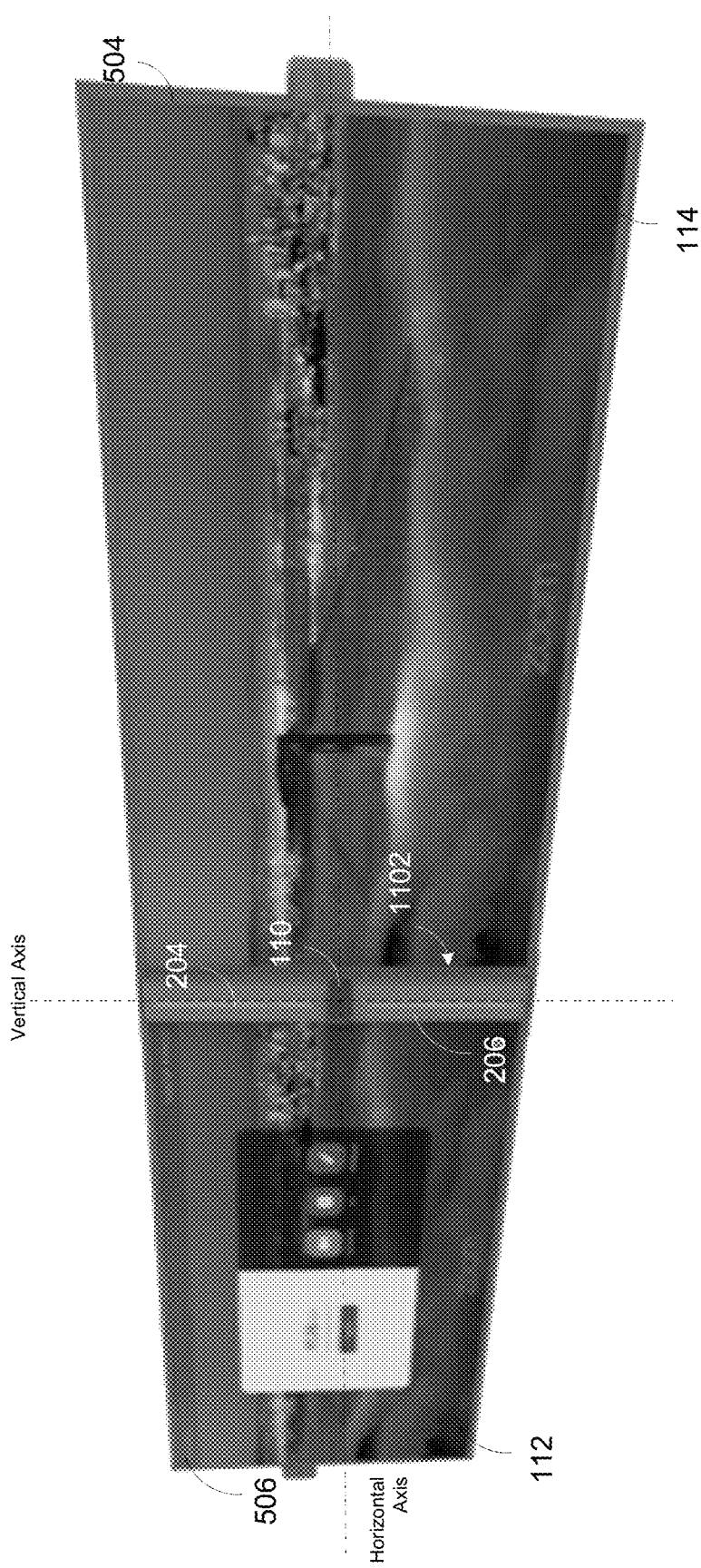
FIG. 11 is a tenth immersive teleconferencing system.
Figure 12:
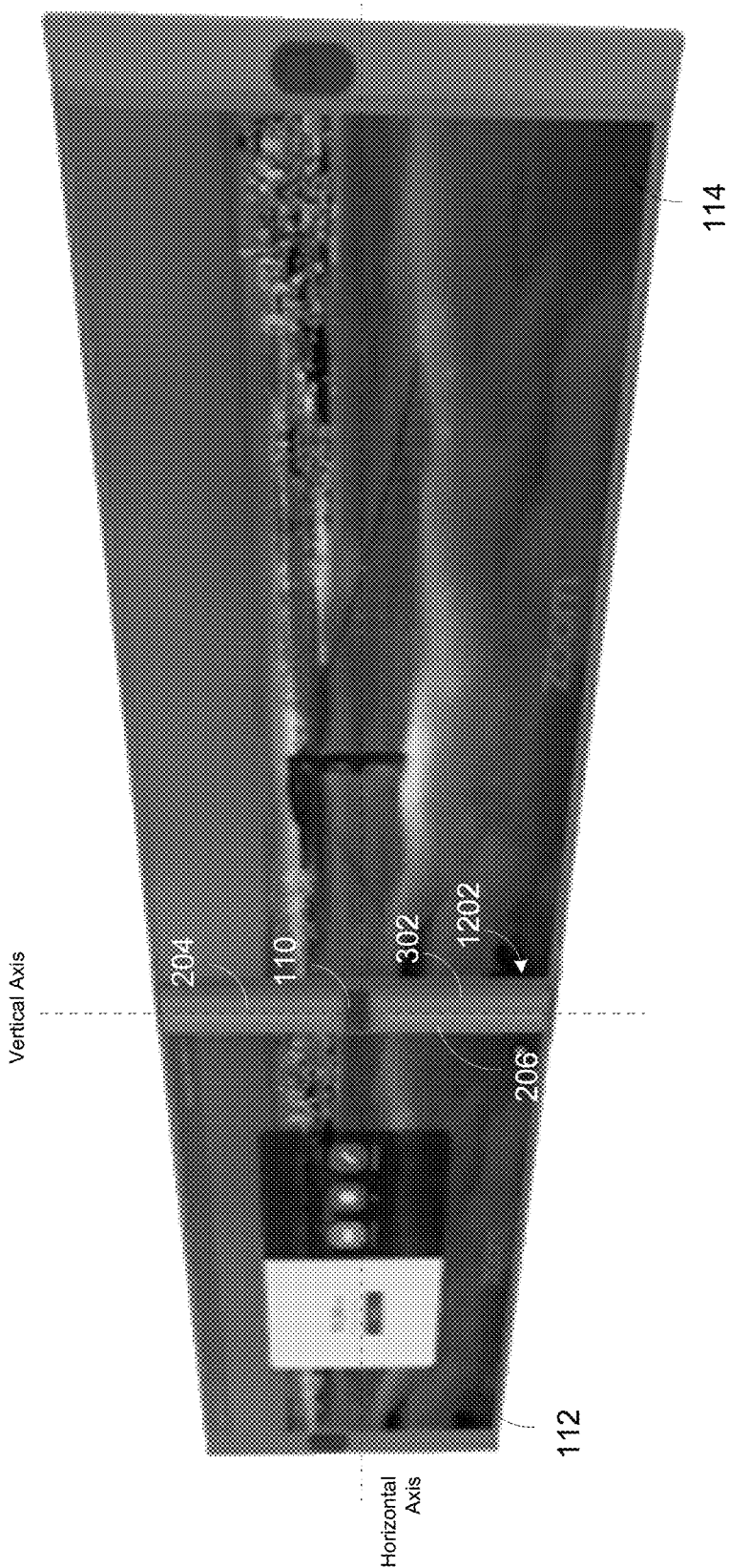
FIG. 12 is an eleventh immersive teleconferencing system.

FIGS. 11 and 12 are the tenth an eleventh teleconferencing systems that comprise three cameras (or camera clusters) enclosed in an exemplary centrally positioned crescent shape 1102 and cross-sectional obround-like shape substantially vertically extending enclosures 1202, respectively. The disclosed alignment herein assures a center eye-level placement cameras 110 disposed between two loudspeakers along a substantially vertical axis that split the audio workload between the two loudspeakers. The cameras 110 align with the horizontal center axis of the optional screens (also referred to as displays) 112 and 114 to ensure that when participants are viewing the displays, they are looking directly into one or more cameras. The cameras include long-focus and short focus lens cameras distributed near the center and the proximal and distal ends of the immersive teleconferencing systems. The long-focus lens cameras have a physical length shorter than the focal length. As in all the figures, some alternate immersive teleconferencing systems include additional loudspeaker systems such as all-in-one or interfaceable loudspeaker systems enclosed by their substantially vertical enclosures and some include the optional latitudinal lateral bar 204 and 206 and/or horizontal or curved light bars directly above or below the central camera 110.

In some systems, the combination of ultra-wide-angle lens and telephoto lens, through a tri-camera collaboration renders panoramic views and detailed presentations of the teleconferencing space. In these systems, the telephoto camera zooms into the image details in the teleconferencing space and the screen processor and/or hub 1614 automatically optimize the brightness and image clarity on the screen and latitudinal lateral and horizontal bar 204 and 206 according to lighting conditions and the desired and/or predetermined delivered color temperatures.

Figure 13:
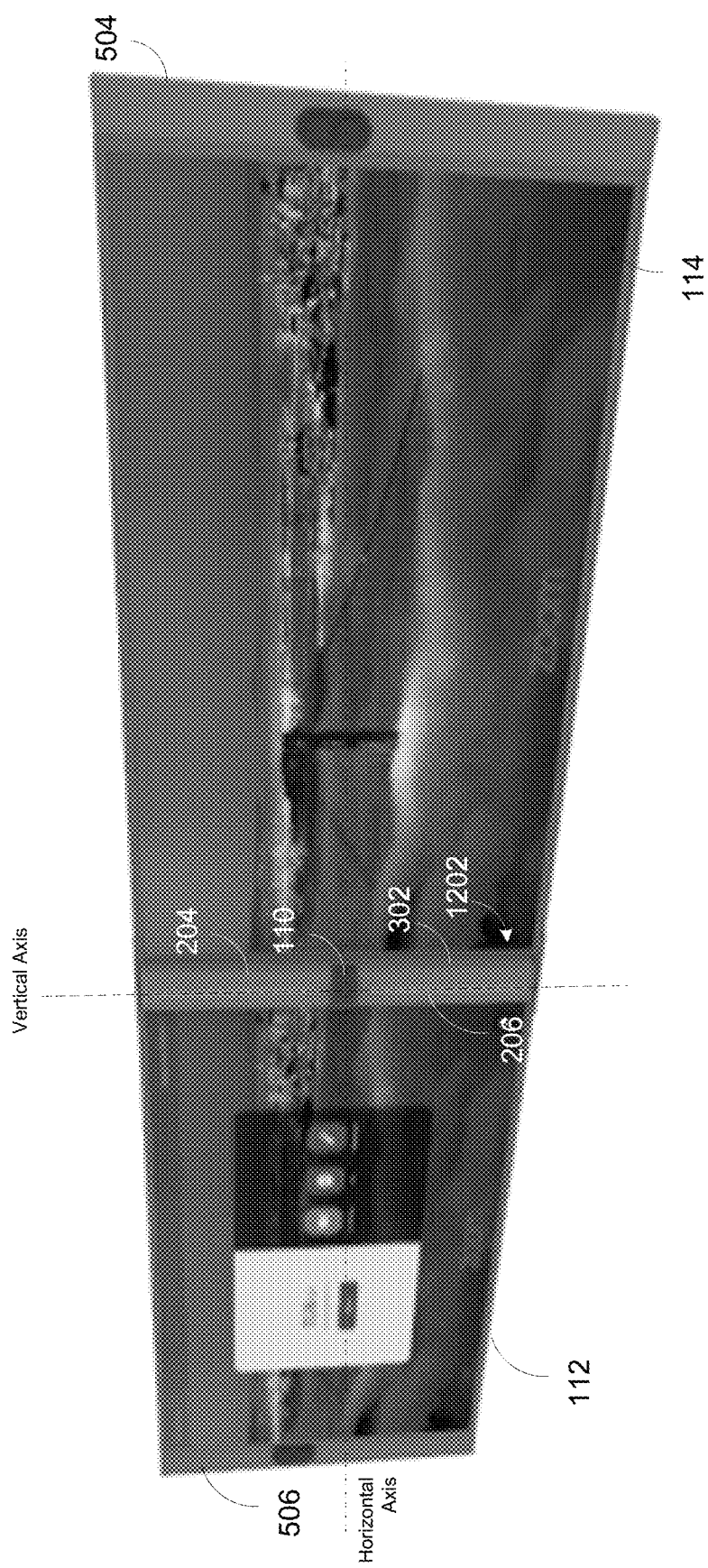
FIG. 13 is a twelfth immersive teleconferencing system.
Figure 14:
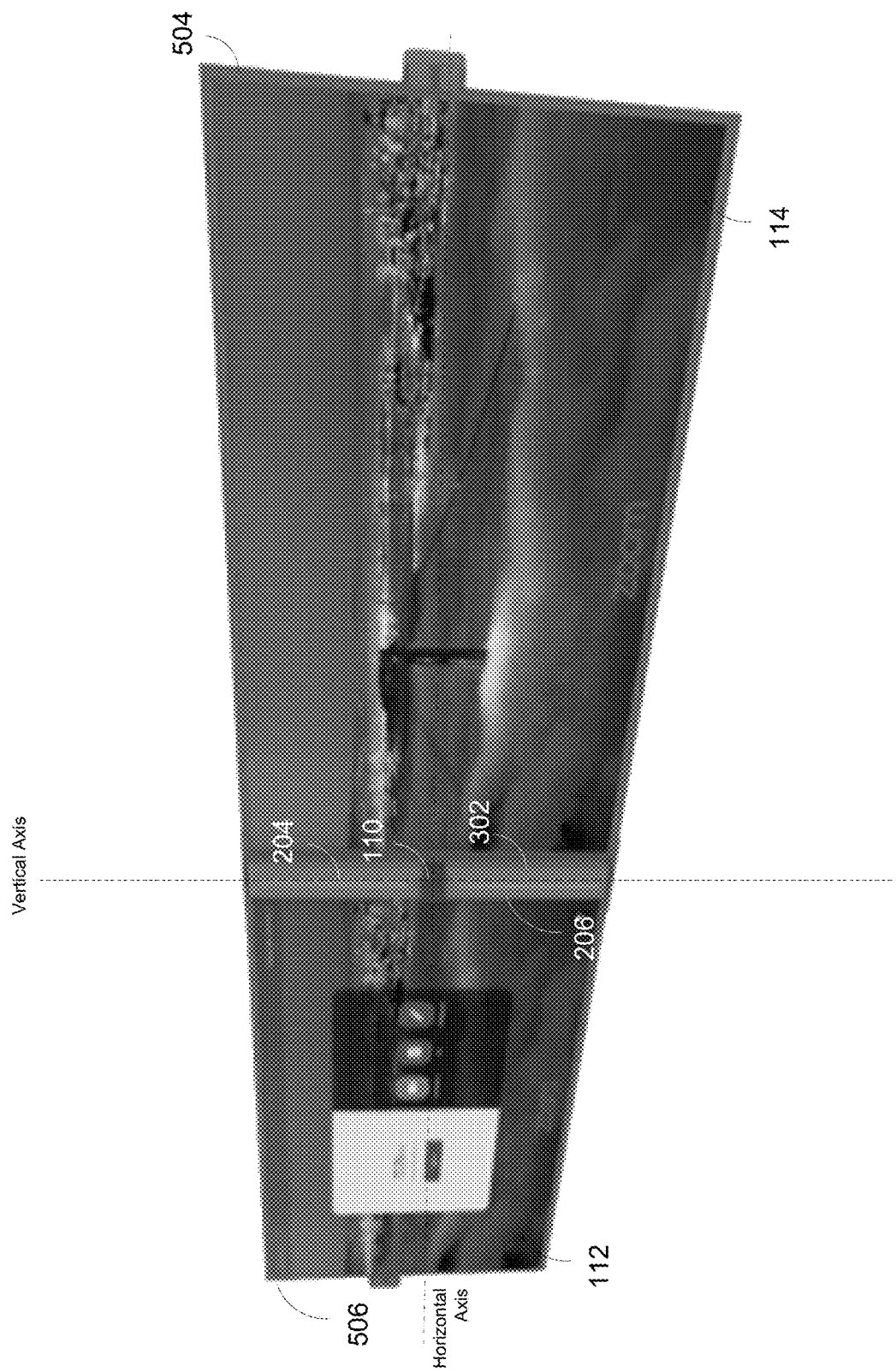
FIG. 14 is a thirteenth immersive teleconferencing system.

FIGS. 13 and 14 are alternate immersive teleconferencing systems that comprise seven cameras (or camera clusters) enclosed in a centrally located sectional obround shaped enclosure that extends vertically along a portion of a substantially latitudinal or vertical axis. The enclosure couples the entire lateral sides and joining sections of the optional screens 112 and 114, respectively. In some systems, the enclosures of FIGS. 13 and 14 house two or more loudspeakers positioned above and below the centrally positioned camera that can include an optional all-in-one and/or interfaceable loudspeaker systems and latitudinal lateral bars 204 and 206 comprising the features and functionality described in this disclosure and are further embodiments of the immersive teleconferencing systems. Both of the sound and lighting systems are centrally located or distributed locally within and are unitary with or integrated to the immersive teleconferencing systems shown in FIGS. 13 and 14.

In FIGS. 13 and 14 the centrally located camera cluster include a combination of rectilinear lenses, tilt-shift lenses, and one hundred and eighty degree lenses. The lenses allow participants to see half a rotation about an object and to render substantially non-distorted views. In some systems, the focal lengths are below about 16 mm. The proximal and distal peripheral cameras and/or clusters provide non-distorted side views that are weaved together.

In some alternate systems, each of the loudspeakers in the vertically oriented enclosures use substantially single or multiple identical drivers, allowing the loudspeakers to function like a line source instead of a point source. Some line sources radiate in phase in a more cylindrical sound delivery pattern, which is advantageous for vertically oriented sound, as line sources interact less with the floor and ceiling of the teleconferencing space. But a cylindrical radiation pattern is a disadvantage if the redundant drivers are driving horizontally positioned loudspeakers. Most horizontal orientations cause sound to interact more with the floor and ceiling area of the teleconferencing space, and suffer poorer response horizontally across the teleconferencing space.

Figure 15:
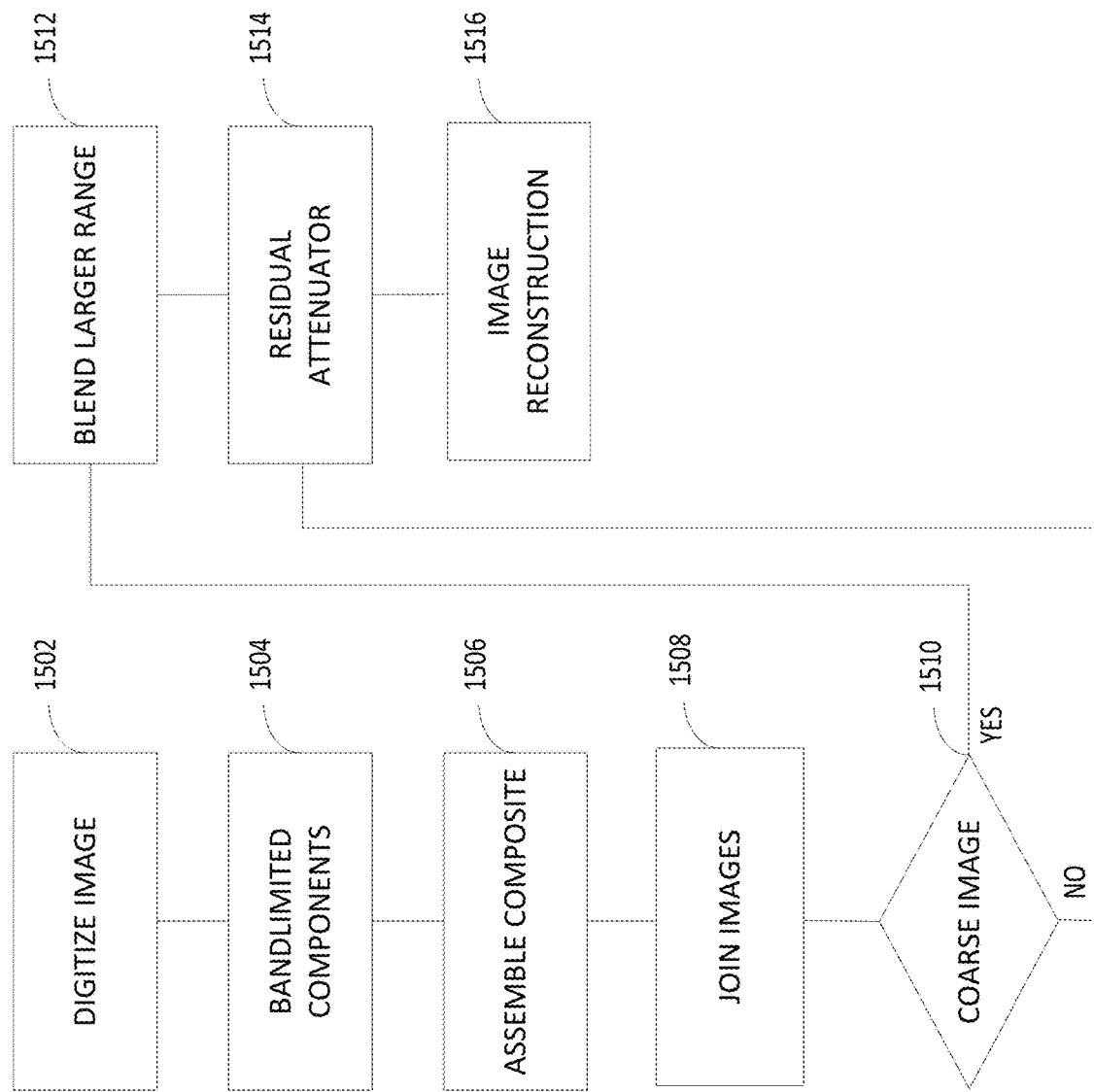
FIG. 15 is an immersive teleconferencing alignment process of FIGS. 1-14.

In some alternate systems, the panoramic views of some or all of the disclosed systems are generated by digitizing the images at 1502 and transforming images captured by the cameras in the cameras' boundary and/or overlapping regions into bandlimited filtered component images corresponding to associated boundary images via boundary filtering at 1504 as shown in FIG. 15. The component images in each frequency band are assembled into a corresponding bandlimited composite at 1506. In some processes, component images are joined. Some are joined using a preassigned weighting and some are joined by a weighted average within a zone and/or region which is proportional to the image band size and/or to the measured or estimated wave length assigned to each image band at 1508. When images are broken down into finer resolutions rendering coarser images, the bands are extended to blend the component images gradually over a relatively larger frequency range than lower resolution image joining without blurring or otherwise degrading the finer image details of the images 1510 and 1512. Once blended, artifacts in the frequency band are dampened and/or attenuated at 1514 by an optional attenuation filter if needed and the bandlimited composite images are summed to render a composite image at 1516. By this process, the image boundaries are matched to the scale of the features within the images.

Figure 16:
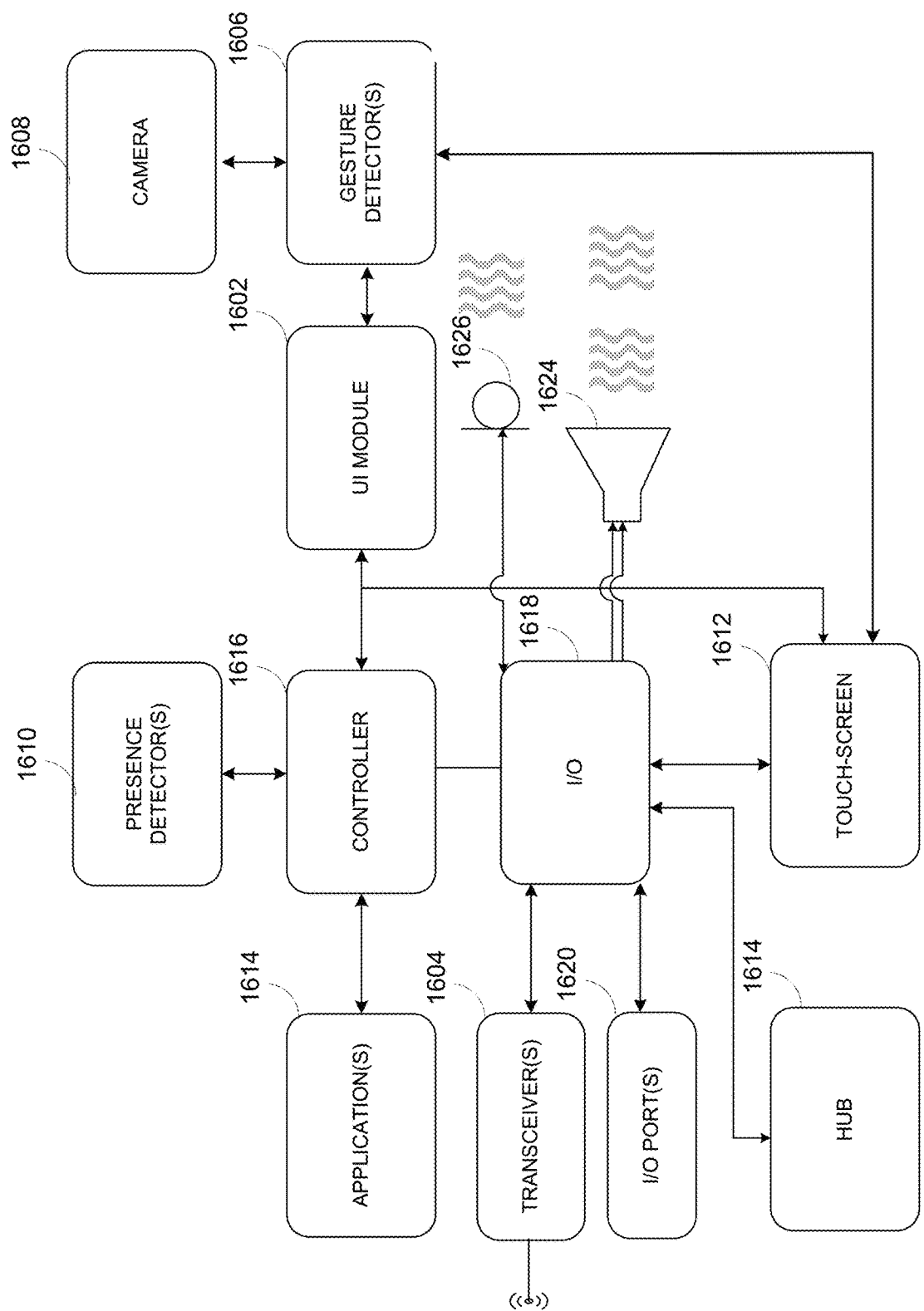
FIG. 16 is exemplary hardware that enables the immersive teleconferencing systems of FIGS. 1-15.

FIG. 16 is a block diagram of an exemplary immersive teleconferencing system. The system includes a user interface module 1602 that interfaces other user interfaces through an optional touch-screen 1612, an optional mobile application (not shown, accessed via the transceivers 1604) and/or an optional gesture detector 1606 that captures the user's physical movements and touchless gestures. The system further includes one or more cameras or camera clusters 1608, and an optional controller 1610. As shown, an optional proximity or optional optical sensor 1610 detects a user's presence, and in some optional software applications, measures or estimates distance of one or more users (e.g., the target(s)) in the configurable conference space without physical contact with the optional sensor 1610. An optional passive infrared and/or motion sensor that is unitary or integrated with one or more cameras in some systems, and/or one of more of the camera clusters 1608 in some other systems, for example, detect the presence of one or more users, such as when motion is detected when a gesture occurs or a presence is detected. The systems transition from a stand-by-state to an interactive state (e.g., an active state) when the user is detected.

The user interface 1602 connects to teleconferencing applications 1614 through the optional controller 1616 of FIG. 16. The optional controller 1616 provides and controls access to the circuitry that inputs and outputs data and commands through an I/O subsystem 1618. The I/O subsystem 214 serves as an interface between input/output peripherals that communicate to the immersive teleconferencing system, such as through the optional touch-screen 1612 and other input/control devices. The I/O subsystem 1618 includes an optional touch-screen controller (not shown) and one or more and I/O ports 1618 that may serve optional mobile applications and other devices. In FIG. 16, the optional controller 1616 provides access to the transceivers 1604 that transmit and receive data via one or more devices, and audio circuitry that includes one or more audio loudspeakers 1624 or loudspeaker arrays and one or more microphones 1626 or microphone arrays that may comprise a beamforming arrays, respectively, that serve as an audio interface between the local and remote users via the immersive teleconferencing system, or alternatively, are part of the camera 1608 or camera clusters.

Figure 17:
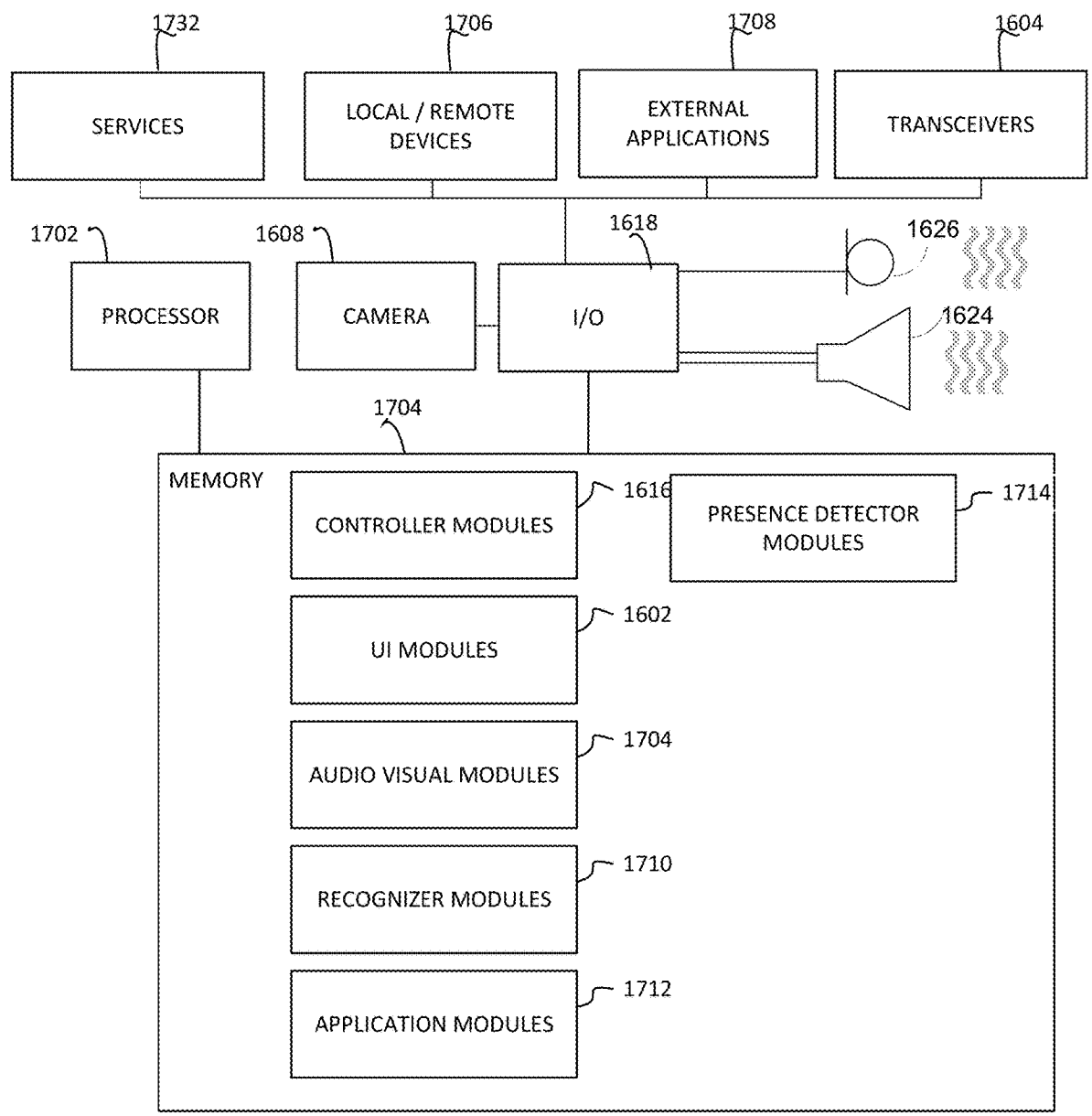
FIG. 17 is an alternate exemplary hardware system that enables the immersive teleconferencing systems of FIGS. 1-16.

FIG. 17 is a block diagram of systems that may execute the process flows, functions, and the systems described herein and those shown in FIGS. 1-16. The system comprises one or more processors, one or more parallel processors or one or more graphical processor (represented as processor 1702), a non-transitory electronic media such as a memory 1704 (the contents of which are accessible by one or more processors 1702), a network, local/and remote devices 1706, external applications 1708, external services 1708, a microphone or microphone array 1626 (that may comprise a microphone beamformer(s) that may be surrounded by one or more enclosures that convey(s) and/or receive(s) audio and/or aural signals to one or more predesignated participants), one or more loudspeakers 1624 (that may comprise a loudspeaker beamformer(s) that may be surrounded by one or more enclosures that convey(s) and/or receive(s) audio and/or aural signals to one or more predesignated participants), optional audio amplifiers (not shown), audio interfaces (not shown), one or more cameras or clusters (also represented by the camera 1608), transceivers 1604 and an I/O subsystem 1618. The I/O sub system 1618 connects devices and local and/or replicated remote software applications. The memory 1704 stores instructions, which when executed by the processor 1702, causes the system to render some or all of the functionality associated with the immersive teleconferencing system. The memory 1704 stores instructions a non-transitory computer readable media, which when executed by the processor 1702, causes the system to automatically render functionality through the hardware that enables the immersive teleconferencing systems. The hardware includes code that serves as the controller modules 1616, transitional user interface modules 1602, audio visual input mode modules 1704 that receive local content, gesture recognition modules 1710, teleconferencing system application modules 1712, aligns the camera(s) to simulate contact at eye-level, and optional presence detection modules 1714. In yet another system, the non-transitory media provided functionality is served entirely or partially through cloud system. The term cloud or cloud system is intended to broadly encompass hardware and software that enables processes to be executed and data to be maintained, managed, and backed up remotely and made available to users over a network. In this system, clouds and/or cloud storage provides ubiquitous access to the system's resources that can be rapidly provisioned over a public and/or a private network. Clouds and/or cloud storage allows for the sharing of resources, features, and utilities to achieve coherence services.

Alternate systems are not limited to the particular hardware and algorithms described above. Alternate systems may execute the process flows, functions, execute, and emulate the systems described and those shown in FIGS. 1-18. The systems comprise one or more processor units 1702, parallel processor units 1702, and/or processor clusters 1702 and/or graphical processor units 1702, parallel graphical processor units 1702 and/or graphical processor unit clusters 1702, a non-transitory media such as a memory 1704 (the contents of which are accessible to the one or more processors 1702, which include some or all of the processors described or recited herein). The input and output interface 1618 connects devices and local and/or remote applications 1708, for example, applications that enable active speaker tracking, noise and sound features that improve or triple immersive audio fidelity and video fidelity (compared to systems without them), the use of artificial intelligence to dynamically switch between portrait and landscape modes and executes virtual static and dynamic scene capture and Bluetooth® and WIFI interfaces that enable the interfacing to mobile devices. In some systems the applications are accessible from one or more clouds or cloud services. The memory 1704 stores instructions, which when executed or accessed by the processors 1702, causes the system to automatically render functionality that enables video conferencing.

The cloud/cloud services, memory 1704 and/or storage disclosed also retain an ordered listing of executable instructions for implementing the processes, system functions, and features described above in a non-transitory computer readable code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The cloud/cloud services and/or memory 1704 may comprise a single device or multiple devices that may be disposed on one or more dedicated memory devices or disposed within a processor, customized circuit or other similar device. When functions, steps, etc. are "responsive to" or occur "in response to" another function or step, etc., the functions or steps necessarily occur as a result of another function or step, etc. A device or process that is responsive to another requires more than an action (i.e., the process and/or device's response to) merely follow another action. The term "substantially" or "about" encompasses a range that is largely in some instances, but not necessarily wholly, that which is specified. It encompasses all but a significant amount, such as specified or within ten to twenty percent. In other words, the terms "substantially" or "about" means equal to or at or within ten to twenty percent of the expressed value. In some systems, the term "nearly" encompasses a range equal to or at or within about fifty percent of the expressed value. The terms real-time and real time refers to systems that update information at the same rate as they receive data, enabling them to direct and control a process such as an immersive teleconferencing system. Some real-time systems operate at a faster rate as the physical element it is controlling. The terms coupled, coupling, and versions of the term are intended to broadly encompass both direct and indirect connections. Thus, a first and a second part are said to be coupled together when they directly physically contact one another, as well as when the first part couples to an intermediate part that couples either directly or via one or more additional intermediate parts to the second part.

The systems disclosed herein may be practiced in the absence of any disclosed or expressed element (including the hardware, the software, and/or the functionality expressed), and in the absence of some or all of the described functions association with a process step or component or structure that are expressly described. The systems may operate in the absence of one or more of these components, process steps, elements and/or any subset of the expressed functions. For example, some systems comprise an audio/visual camera positioned between two loudspeakers. Some cameras are position along or about a substantially vertical axis within a substantially vertically extending enclosure or alignment. In some systems, a centrally positioned camera has a 16:9 aspect ratio and some are positioned centrally relative to a horizontal axis that equally balances or separates the upper and lower portions of the two more optional displays it may be positioned there between and/or positioned on opposite lateral sides. Other systems may position and align the audio/visual camera or cameras described herein at the participants' sitting eye-level. The eye-level cameras are positioned at a vertical height (relative to the surface of the room which participants walk) that is a function of an empirical height constant and a tilt angle (e.g., the geometric angle between the center axis of an estimated participant's eye's position and a central axis of a desired teleconferencing display). Specifically, the sitting eye-level vertical height is defined by an empirical height constant and the product of horizontal watching distance factor and the tangent of the of the participant's tilt angle ($\Phi$). In some systems the participant's tilt angle ($\Phi$) is limited to or equal to any angle within about a ten degree range. In some systems, the camera's tilt angle ($\delta$) is limited to or equal to an angle within about ten times the empirical tilt angle range ($\Theta$). In some systems, the restriction is associated with or assigned to a type of video conferencing displays. For example, when displays are touch enabled, tilt angles ($\Phi$) are limited to an angular range between or equal to about zero to about ten degrees. In other words, in some systems that tilt angles are limited to a range of angles in response to the physical input capabilities or contact capabilities (the input/output or I/O functions) of the one or more video conferencing displays and/or video conferencing systems. The range of angles are correlated to the type of the teleconferencing display.

In addition to the eye-level alignment, other alternate systems may be further positioned between two or more lateral displays 112 and 114 mechanically and/or electrically coupled to or unitary with the immersive teleconferencing system's substantially vertical enclosure on opposite or opposing sides of the enclosure rending an all-in-one teleconferencing system. The optional lateral displays 112 and 114 may couple the vertically extending enclosure of the teleconferencing system directly or through intermediate parts. Further systems include two or more vertical axis. One or more vertical axis may form a line of reflection for the camera 110, optional lateral displays 112 and 114, loudspeakers, and/or the immersive teleconferencing system. In some immersive teleconferencing system one or more or all of vertical axis are coincident (e.g., axis matching point for point).

Further, the various elements and system components, and process steps described in each of the many systems and processes described herein is regarded as divisible with regard to the individual elements described, rather than inseparable as a whole. In other words, alternate systems encompass any variation and combinations of elements, components, and process steps described herein and may be made, used, or executed without the various elements described (e.g., they may operate in the absence of) including some and all of those disclosed in the prior art but not expressed in the disclosure herein. Thus, some systems do not include those disclosed in the prior art including those not described herein and thus are described as not being part of those systems and/or components and thus rendering alternative systems that may be claimed as systems and/or methods excluding those elements and/or steps.

The immersive teleconferencing systems generates images that roll off one or more screens. The cameras capture images in the video conference space. Some centrally located cameras are positioned at participants' sitting eye-level and some are positioned between two loudspeakers spaced apart about a substantially vertical axis. Some camera(s) capture participants in the conference space equally, without rendering visual artifacts. Eye-level camera that include the disclosed alignments generate face-to-face viewing angles that captures participants on equal terms. It allows participants to feel like themselves. When participants look into systems that couple displays they are often looking at eye-level into the immersive teleconferencing system's camera(s) too. The camera(s)' positions simulate eye contact and connect remote and local participants in an intimate way. Eye-level shots make meetings more engaging as they allow users to see how someone looks and feels while naturally engaging with them. The immersive teleconferencing system's setup makes it easier for participants to express their thoughts and share their emotions.

The disclosed systems and methods also eliminate the user's need to learn the computational processes to set up the system. They are replaced by an intuitive transitional user interface and application programming interface or APIs that enables local-to-remote communication. The systems expose a secure interface that makes external connections in the background in real time, visualizes those connections through representations on the optional displays 112 and 114 and some systems translate user's touchless gestures and/or physical touch gestures from one device into protocol specific commands understood and executed by another device (such as a remote device) or proprietary commands to teleconferencing applications that enable a result such as the selection and switching of an input, a selection of a feature, and/or a transfer of content between one or more local-to-remote locations or devices. In some systems, the interface translations are based on the active state of the immersive teleconferencing system's operating state during the teleconferencing session (e.g., detected by a processor 1702), such as when the user is accessing a virtual huddle room, a virtual meeting room, a zoom room, an audio-visual input, or accessing a menu, for example. A teleconferencing session refers to a series of requests and response to perform a complete task or set of task between a client and a server teleconferencing system.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. An immersive teleconferencing system comprising:
   a plurality of three-dimensional sides positioned about a vertical axis forming a line of reflection of the immersive teleconferencing system; the plurality of three-dimensional sides terminating at ends forming an enclosure;
a camera housed at a substantially central position of the enclosure;
a first loudspeaker disposed above the camera about the vertical axis; and
a second loudspeaker disposed below the camera about the vertical axis.

2. The immersive teleconferencing system of claim 1 where the first loudspeaker comprises a beamforming sensor array.

3. The immersive teleconferencing system of claim 1 further comprising a user interface that senses a plurality of touchless gestures.

4. The immersive teleconferencing system of claim 1 where the first loudspeaker comprises a first set of loudspeakers and the second loudspeaker comprises a second set of loudspeakers.

5. The immersive teleconferencing system of claim 1 where the camera is positioned at an eye-level position based on a geometric angle between a center axis of a plurality of estimated participant eyes positions and a central axis of a teleconferencing display, the teleconferencing display mechanically coupled to the camera.

6. The immersive teleconferencing system of claim 5 where the geometric angle is limited to a range of angles correlated to a type of the teleconferencing display.

7. An immersive teleconferencing system comprising:
a plurality of three dimensional parallel sides terminating at ends forming an enclosure;
an eye-level camera housed at a substantially central position of the enclosure along a vertical axis of the enclosure forming a line of reflection of the camera and the immersive teleconferencing system;
a first loudspeaker disposed above the camera centered along the vertical axis; and
a second loudspeaker disposed below the camera centered along the vertical axis.

8. The immersive teleconferencing system of claim 7 where a vertical height of the eye-level the camera is established by a height constant and a tilt angle formed with a quantitative horizontal watching distance factor.

9. The immersive teleconferencing system of claim 8 where the tilt angle comprises a geometric angle with a center axis of an estimated participant's eye's position and a central axis of a teleconferencing display coupled to the eye-level camera.

10. The immersive teleconferencing system of claim 9 where the geometric angle is based on a physical input to a video conferencing display coupled to the eye-level camera.

11. The immersive teleconferencing system of claim 7 where the first loudspeaker comprises a beamforming sensor array.

12. The immersive teleconferencing system of claim 7 further comprising a user interface that senses and processes touchless gestures.

13. The immersive teleconferencing system of claim 7 where the enclosure surrounds a beamformer that selectively delivers sounds directly to a plurality of predesignated participants.

14. The immersive teleconferencing system of claim 7 further comprising a plurality of lateral bars extending from a plurality of central ends of the camera to a proximal end and a distal end of the enclosure.

15. An immersive teleconferencing system comprising:
a plurality of three dimensional parallel sides terminating at ends forming an enclosure;
a camera housed at a substantially central position of the enclosure along a vertical axis of the enclosure forming a line of reflection of the camera and the enclosure; and
a first loudspeaker disposed above the camera centered along the vertical axis; and
a second loudspeaker disposed below the camera centered along the vertical axis;
a first display screen coupled along a first lateral side of the enclosure; and
a second display screen coupled along a second lateral side of the enclosure opposite the first lateral side.

16. The immersive teleconferencing system of claim 15 where the camera comprises a camera cluster.

17. The immersive teleconferencing system of claim 15 where the first loudspeaker comprises a beamforming sensor array.

18. The immersive teleconferencing system of claim 15 further comprising a user interface that senses and processes touchless gestures.

19. An immersive teleconferencing system comprising:
a plurality of sides positioned about a first vertical axis forming a line of reflection of the immersive teleconferencing system; the plurality of sides terminating at ends forming an enclosure;
a set of at least one camera housed near a substantially central position within the enclosure about a second vertical axis of the enclosure;
a first set of at least one loudspeaker disposed above and apart from the camera; and
a second set of at least one loudspeaker disposed below and apart from the camera.

20. The immersive teleconferencing system of claim 19 where the set of at least one camera is positioned along the second vertical axis.

21. The immersive teleconferencing system of claim 20 where the first vertical axis is coincident with the second vertical axis.

* * * * *